US010120962B2

(12) United States Patent
Fusco et al.

(10) Patent No.: US 10,120,962 B2
(45) Date of Patent: Nov. 6, 2018

(54) POSTERIOR ESTIMATION OF VARIABLES IN WATER DISTRIBUTION NETWORKS (71) Applicant: International Business Machines Corporation, Armonk, NY (US)

(72) Inventors: Francesco Fusco, Kildare (IE); Sergiy Zhuk, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 14/474,950

(22) Filed: Sep. 2, 2014

(65) Prior Publication Data

US 2016/0063147 A1 Mar. 3, 2016

(51) Int. Cl.
*G06F 17/10* (2006.01)
*G06F 17/50* (2006.01)
*G06Q 10/04* (2012.01)
*G06Q 50/06* (2012.01)

(52) U.S. Cl.
CPC ......... *G06F 17/5009* (2013.01); *G06Q 10/04* (2013.01); *G06Q 50/06* (2013.01); *G06F 2217/10* (2013.01); *G06F 2217/34* (2013.01)

(58) Field of Classification Search
CPC . G06Q 50/06; G06F 2217/34; G06F 17/5009; G06F 17/11; G01F 1/00; G01F 1/34
See application file for complete search history.

(56) References Cited

U.S. PATENT DOCUMENTS

| 7,302,372 | B1 | 11/2007 | Wu et al. | |
|---|---|---|---|---|
| 7,457,735 | B2 | 11/2008 | Wu et al. | |
| 7,593,839 | B1 | 9/2009 | Wu et al. | |
| 2011/0191267 | A1 | 8/2011 | Savic et al. | |
| 2011/0264282 | A1 | 10/2011 | Blank et al. | |
| 2012/0209575 | A1* | 8/2012 | Barbat | G06F 17/5009 703/2 |
| 2012/0316852 | A1 | 12/2012 | Blank et al. | |
| 2013/0211797 | A1 | 8/2013 | Scolnicov et al. | |
| 2014/0039849 | A1 | 2/2014 | Preis | |
| 2014/0052409 | A1 | 2/2014 | Mevissen et al. | |
| 2014/0052421 | A1 | 2/2014 | Allen et al. | |
| 2014/0163916 | A1* | 6/2014 | Ba | G06Q 10/04 702/100 |
| 2014/0358499 | A1* | 12/2014 | Sambur | G06F 17/5009 703/2 |
| 2015/0153476 | A1* | 6/2015 | Prange | E21B 43/00 703/2 |

(Continued)

OTHER PUBLICATIONS

Kapelan et al., "Calibration of Water Distribution Hydraulic Models Using a Bayesian Recursive Procedure" (Aug. 2007), Journal of Hydraulic Engineering, vol. 133, Issue 8, pp. 927-936 [retrieved from http://ascelibrary.org/doi/abs/10.1061/(ASCE)0733-9429(2007)133:8(927)].*

(Continued)

*Primary Examiner* — Brian W Wathen
(74) *Attorney, Agent, or Firm* — L. Jeffrey Kelly (57) ABSTRACT

A system for posterior estimation of variables. Receiving a set of data inputs. Determining a first model of the water distribution network based on the set of data inputs. Determining a second model of the water distribution network based on the set of data inputs, and the first model.

20 Claims, 4 Drawing Sheets

(56) References Cited

U.S. PATENT DOCUMENTS

2016/0328655 A1* 11/2016 Adams .................. G06N 7/005

OTHER PUBLICATIONS

Walski, T., "Technique for Calibrating Network Models" (Oct. 1983), Journal of Water Resources Planning and Management, vol. 109, No. 4, pp. 360-372 [retrieved from https://www.researchgate.net/profile/Tom_Walski/publication/243631101_Technique_for_Calibrating_Network_Models/links/5665843b08ae192bbf9235eb.pdf].*

Kapelan, Z., "Calibration of Water Distribution System Hydraulic Models" (Feb. 2002), pp. 1-335 [retrieved from http://people.exeter.ac.uk/zkapelan/ZK_PhD_Thesis.pdf].*

Vrugt et al., "A Shuffled Complex Evolution Metropolis algorithm for optimization and uncertainty assessment of hydrologic model parameters" (2003), Water Resources Research, vol. 39, No. 8, pp. 1-14 [retrieved from http://onlinelibrary.wiley.com/doi/10.1029/2002WR001642/full].*

Kitanidis, P., "Parameter Uncertainty in Estimation of Spatial Functions: Bayesian Analysis" (Apr. 1986), Water Resources Research, vol. 22, No. 4, pp. 499-507 [retrieved from http://web.stanford.edu/group/peterk/pdf/pkk_wrr_v22_1986.pdf].*

Lansey et al., "Parameter Estimation for Water Distribution Networks" (1991), J. Water Resour. Plann. Manage., vol. 117, Issue 1, pp. 126-144 [retrieved from http://ascelibrary.org/doi/abs/10.1061/(ASCE)0733-9496(1991)117:1(126)].*

Ormsbee, "Implicit Network Calibration" (Mar. 1989), Journal of Water Resources Planning and Management, vol. 115, Issue 2, pp. 243-257 [retrieved from http://ascelibrary.org/doi/abs/10.1061/(ASCE)0733-9496(1989)115:2(243)].*

Raghavendran et al., "Design and Implementation of a Network Management System for Water Distribution Networks" (Dec. 18-21, 2007), 15th International Conference on Advanced Computing and Communications, pp. 706-711 [retrieved from http://ieeexplore.ieee.org/abstract/document/4426050/].*

Walski, T., "Techinique for Calibrating Network Models" (Oct. 1983), Journal of Water Resources Planning and Mangement, pp. 360-372 [retrieved from https://www.researchgate.net/profile/Tom_Walski]. (Year: 1983).*

Burgschweiger et al., "Optimization Models for Operative Planning in Drinking Water Networks," Konrad-Zuse-Zentrum für Informationstechnik Berlin, Dec. 2004, pp. 1-24, ZIB-Report 04-48.

Duzinkiewicz, "Set Membership Estimation of Parameters and Variables in Dynamic Networks by Recursive Algorithms With a Moving Measurement Window," Int. J. of Appl. Math. Comput. Sci., 2006, pp. 209-217, vol. 16, No. 2.

Kang et al., "Real-Time Demand Estimation and Confidence Limit Analysis for Water Distribution Systems," Journal of Hydraulic Engineering, Oct. 1, 2009, pp. 825-837, vol. 135, No. 10.

Kang et al., "Sequential Estimation of Demand and Roughness in Water Distribution System," Water Distribution System Analysis, Sep. 12-15, 2010, Tucson, AZ, USA, 7 pages.

Kumar et al., "Parameter Estimation in Water Distribution Networks," Water Resour Manage, 2010, pp. 1251-1272, vol. 24, Springer Science + Business Media B.V.

Savic et al., "Quo vadis water distribution model calibration?," Urban Water Journal, Mar. 2009, pp. 3-22, vol. 6, No. 1, Taylor & Francis.

Walski et al., "Determining the Accuracy of Automated Calibration of Pipe Network Models," 8th Annual Water Distribution Systems Analysis Symposium, Aug. 27-30, 2006, pp. 1-18, Cincinnati, Ohio, USA.

Wasserkrug et al., "Optimization Platform for Water Distribution Networks," U.S. Appl. No. 14/145,932, filed Jan. 1, 2014, pp. 1-23.

Xia et al., "State Estimation of Municipal Water Supply Network Based on BP Neural Network and Genetic Algorithm," 2011 International Conference on Internet Computing and Information Services, pp. 403-406, IEEE.

* cited by examiner

POSTERIOR ESTIMATION OF VARIABLES IN WATER DISTRIBUTION NETWORKS

FIELD OF THE INVENTION

The present invention relates generally to the field of data processing, and more particularly to prediction of fluid flow within water distribution networks.

BACKGROUND OF THE INVENTION

In the context of water distribution networks accurate data is critical in predicting future demand, planning emergency scenario simulations, optimization and system modeling. Given the complexity of water distribution networks, any changes or malfunctions within the system will inevitably affect fluid distribution and the supply within.

In order to properly predict and monitor such variables, it may be necessary to create mathematical prediction models of the network incorporating such changes. Available models' accuracy may be greatly affected by unknown system parameters such as change in pipe roughness affecting flow, addition of equipment, or presence of anomalies like leakage.

To this end, once the model is created, it is necessary to utilize known data to ensure such predictions are reliable. A limitation of such modeling procedures is that they approximate the unknown parameters using a short-term sample of hydraulic data, or are limited by insufficient amount of data from a few measuring points which may underrepresent a large size system. Such modeling may create results representing the system hydraulics during the short period of the measuring time but are not expected to accurately represent the system conditions depicting full range of operational conditions and anomalies within. Consequently, any such model may suffer from an inadequate calibration, throwing into question the results after a significant change in the system. Even a series of minor modifications to the system, the model will incrementally depart from that of the original modeling prediction. Thus, even if the calibration is representative of the medium or long-term performance of the system, natural or deliberate changes to the system parameters will introduce further errors into the model.

Accordingly, as time passes the value and effectiveness of the model diminishes. To highlight the effect of time on the accuracy of the model, it will be appreciated that such changes need not be restricted to infrastructure change, but also to deterioration of the network over time and even changes in demand following re-zoning, industrial development and demographic change. The investment of resources, both in terms of time and money, required to generate new models is substantial and inefficient.

A technique for modeling and simulating water distribution and collection systems that includes estimation of future and unknown parameters is greatly desired. Such estimation technique must be more robust and flexible than the existing techniques, to permit model estimation and simulation under more challenging scenarios that prior techniques have not been able to adequately address.

SUMMARY

Embodiments of the present invention disclose a method, computer program product, and system for posterior estimation of variables in water distribution networks. A computer receives a set of data inputs. It determines a first model of the water distribution network based on the set of data inputs. Computer then determines a second model of the water distribution network based on the set of data inputs, and the first model.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
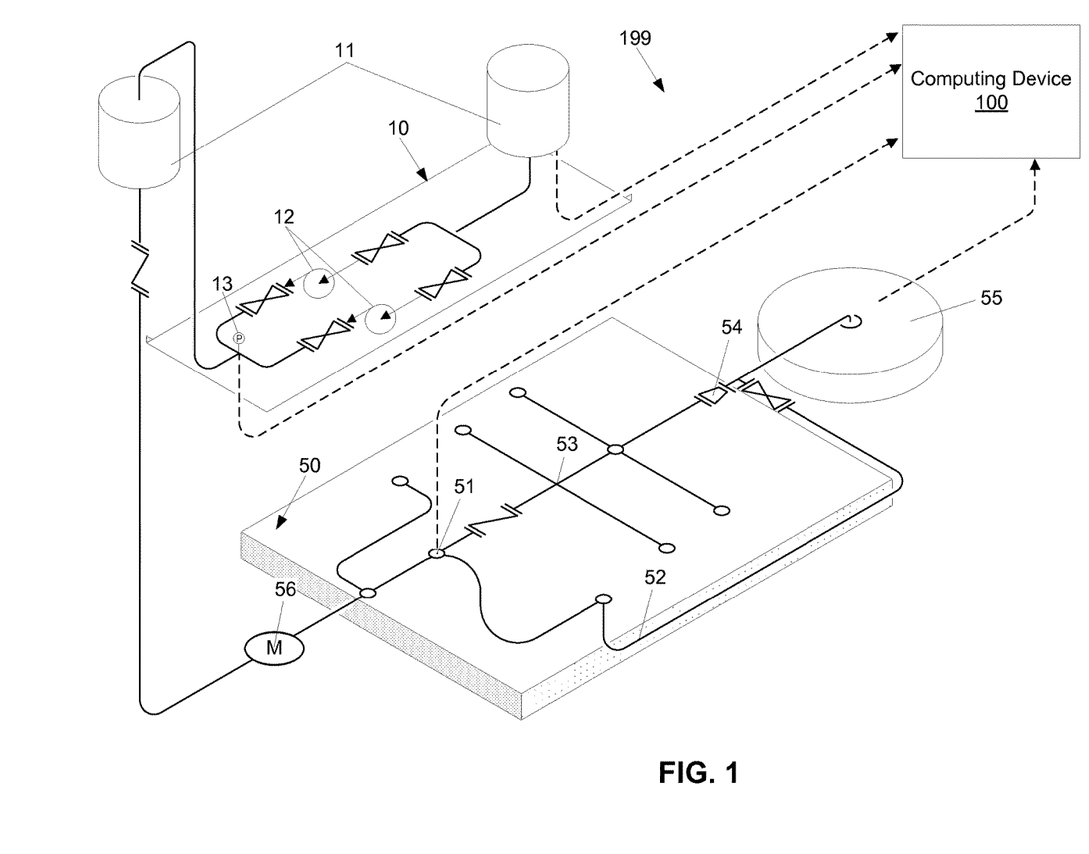
FIG. 1 is a schematic block diagram illustrating a posterior estimation of variables in a water distribution networks processing environment, in accordance with an embodiment of the present invention.

FIG. 1 is a schematic block diagram illustrating a posterior estimation of variables in a water distribution processing environment, in accordance with an embodiment of the present invention. Water distribution system 199 may be divided into a parameter element 10 and a distribution system 50. Parameter element 10 may include transmission pumps 12, output pressure 13, and reservoirs 11. The distribution system 50 acts to deliver water to the various end customers through a branched piping arrangement having an infrastructure including, distribution nodes 51, branched pipe network sections 53, and flow control valves 54 at changing elevation 52.

Model data from various elements within the distribution system 50 and parameter element 10 may be utilized for estimation of variables in the water distribution system 199. In an exemplary embodiment of the invention, such model data may be represented as design parameters, which reflect known system characteristics and elements. For example, design parameters may include the distribution pump rating and its design output pressure, or the number of branches or branch connections within a particular water distribution system and the flow calculations for each branch. Other data may include actual or estimated statistical demand values for branches and nodes within the system. Demand values may encompass water flow or usage by zones or distribution nodes 51, or changes in elevation 52 within the system. Such modeling data may be stored and accessed within computing device 100, in accordance with the embodiments of the present invention.

Similarly, field measurement data may also be collected from sensors present within water distribution system 199. Such data may include measurements from within the distribution system 50 such as actual flow through branched pipe network section 53, or water levels in holding tank 55. Data origination from the parameter element 10 of the water distribution system 199 may also be communicated to a computing device 100 through a variety of sensors typically found in water distribution systems. This data may include water levels of reservoir 11, number of transmission pumps 12 currently in operation, or their output pressure 13 as compared to metering device 56.

It is important to note that although FIG. 1 depicts sensors communicating field measurement data to computing device 100, such data may be collected by operating personnel and be manually inputted into computing device 100. Collectively, using the data from a demand system 50, parameter characteristics 10, and field measurement data computing device 100 may generate a posterior estimation model of existing variables within water distribution system 199.

Figure 2A:
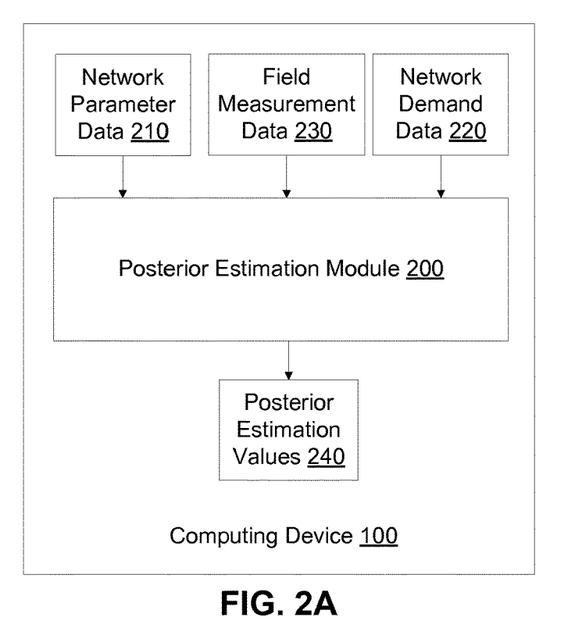
FIG. 2A is a block diagram illustrating posterior estimation data flow, in accordance with an embodiment of the present invention.

FIG. 2A depicts a block diagram illustrating data flow through posterior estimation module 200, in accordance with an embodiment of the present invention. A posterior estimation module 200 located on computing device 100 (FIG. 1), receives network parameter data 210. As will be well understood by those skilled in the art, the hydraulic behavior of the network will depend on the parameters of the elements comprising the water distribution network. For example, network elevations, pipe diameter, pipe roughness coefficient, and pipe length may be considered network parameter data in accordance with the embodiment of this invention.

Upon receiving network parameter data 210, and a measure of uncertainty information, which may be represented as a standard deviation of the input, posterior estimation module 200 may calculate the statistical distribution of the parameters. In an exemplary embodiment of the present invention, posterior estimation module 200 may calculate statistical distribution by assuming that the distribution is Gaussian and includes the mean and standard deviation parameters given as input. As an example, posterior estimation module 200 statistical distribution calculation may be represented as:

$$f(x) = \frac{1}{\sigma\sqrt{2\pi}} e^{-\frac{(x-\mu)^2}{2\sigma^2}}$$

Such parameters may represent the maximum and minimum pump discharge pressures obtained from previously collected design parameters. Standard deviation for each parameter may indicate the amount of variation or dispersion from the mean value. This information can include, but is not limited to, certainty/uncertainty information about pipe parameters (roughness, diameter), nodes demand, valve operational status, etc. The uncertainty information can be expressed as a typical value interval (e.g., the pipe diameter belongs to the interval 9-12 inches) or as mean and standard deviation (e.g., the pipe diameter is 9±2 inches). It is important to note that although the exemplary embodiment of the invention demonstrates specific modules and calculation methods of statistical distribution, it would be well understood by those skilled in the art that such calculation may be performed outside of the posterior estimation module 200, or through varied statistical distributions. Standard deviation for each demand may indicate the amount of variation or dispersion from the mean value.

The posterior estimation module 200 through sensor recording or manual input receives field measurement data 230. In reference to FIG. 1, field measurement data 230 may comprise information sent to computing device 100 from reservoir 11, transmission pumps 12, output pressure 13, metering device 56, or flow control valve 54. Alternatively, the sensors employed can be configured to, for example transmits the field measurement data 230 through a wired or wireless connection automatically transmitting the data. As previously discussed, the field measurement data 200 collected may include, for example, hydraulic data such as pressures and flows at one or more nodes of the network. In an exemplary embodiment of the present invention, statistical distribution of field measurement data 230 may be calculated through mean and standard deviation of each value.

The posterior estimation module 200, the operation of which is described in more detail below in relation to FIG. 3, utilizes the statistical distribution of data collected from water distribution system 199 to perform a joint posterior estimation of received network demand data and network parameter data as compared to available field measurement data 230.

The posterior estimation values 240 are calculated by the posterior estimation module 200 and may be displayed within display screen, in accordance with the embodiments of the present invention.

Figure 2B:
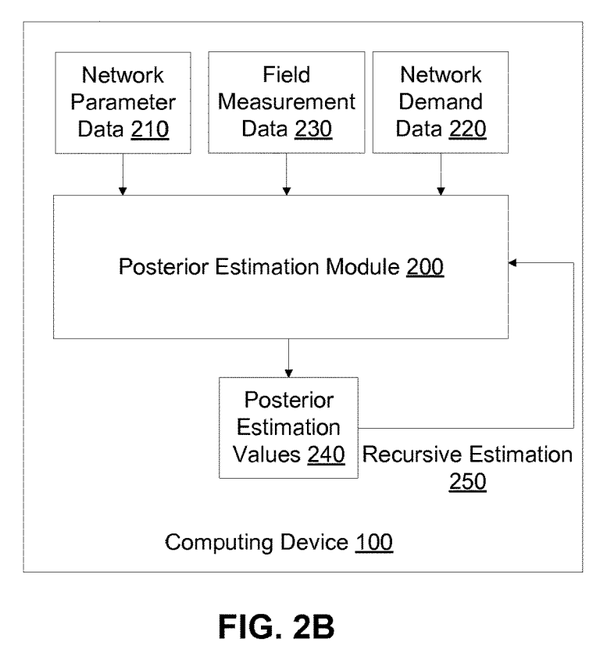
FIG. 2B is a block diagram illustrating recursive posterior estimation data flow, in accordance with an embodiment of the present invention.

FIG. 2B depicts a block diagram illustrating data flow through posterior estimation module 200, in accordance with an embodiment of the present invention. According to the embodiment described in FIG. 2A, posterior estimation module 200 receives and calculates a joint posterior estimation of received network demand data 220 and network parameter data 210 utilizing available field measurement data 230. In addition, the posterior estimation module 200, the operation of which is described in more detail below in relation to FIG. 3, utilizes the statistical distribution of data collected from water distribution system 199 to perform a joint posterior estimation of received network demand data 220 and network parameter data 210 through recursive estimation 250. Recursive estimation allows the posterior estimation module 200 to adopt to any near real time changes within the water distribution system by cyclically recalculating of posterior network estimates by utilizing prior distribution inputs for the current calculation and increases the quality of the model.

Recursive estimation 250, the operation of which is described in more detail below in relation to FIG. 3, allows for a iterative recalculation of posterior network demand data and network parameter data, where at each step the posterior estimates become prior distribution inputs for future estimation as new measurements are received and increases the quality of the model. It is important to note that the recursive estimation 250 may be applied in a dynamic setting where the data is continuously streamed to the posterior estimation module 200 at a predetermined sampling time, or it may also be applied through an offline setting where the final estimation, at the last sampling point, produces the final estimate of the demand and parameters. The finalized posterior estimation values 240 may be displayed within display screen, in accordance with the embodiments of the present invention.

In additional embodiments, the posterior estimation module 200 may also provide an anomaly check of the water distribution system. Such anomaly check may serve to indicate to operating personnel that a piece of equipment is malfunctioning, or the system contains a leak. Posterior estimation module 200 can accomplish this by utilizing the previously estimated posterior parameter values, where such estimated values can be compared against manufacturers' specification for specific equipment, or system design data. As an example, posterior estimation module 200 may extract minimum and maximum values of parameters from already calculated distribution based on percentage representing the likelihood of anomaly. Utilizing Gaussian distribution minimum and maximum ranges may be represented as [$\mu-3\sigma$, $\mu+3\sigma$] where $\mu$ represents the mean and $\sigma$ the standard deviation. Posterior estimation module 200 may determine the probability that the values fall within the ranges and determine the percentile of likely anomaly.

Figure 3:
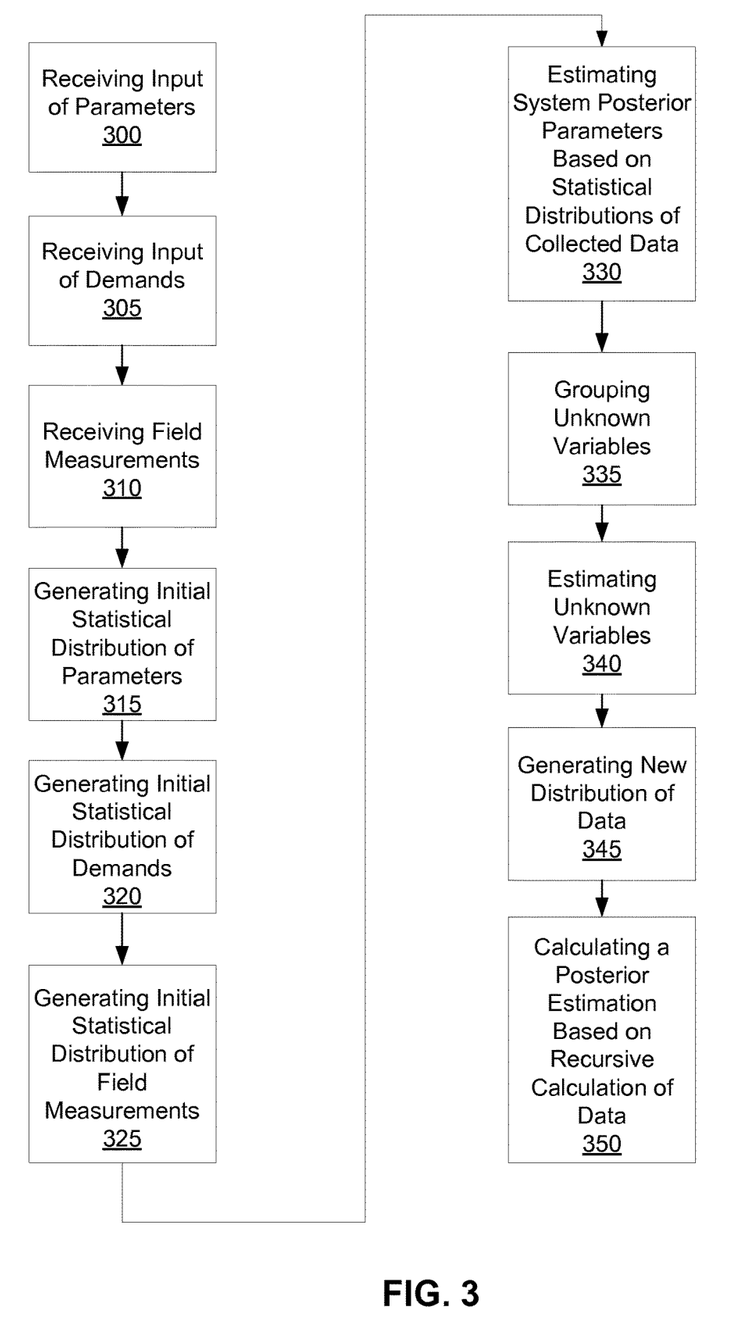
FIG. 3 is a flowchart depicting operational steps of a posterior estimation module, in accordance with an embodiment of the present invention.

FIG. 3 is a flowchart depicting operational steps of the posterior estimation module 200, in accordance with an embodiment of the present invention.

Posterior estimation module 200 receives input of parameters (step 300). The parameters may include, in one embodiment, data relating to pipe roughness, pipe length, locations of valves, or pump settings within the water distribution system 199.

Posterior estimation module 200 receives network demand data and network parameter data (step 305). The network demand data and network parameter data received may include an individual distribution node consumption, demand junction, or reservoir and tank levels of water distribution system 199.

Posterior estimation module 200 also receives performance data from reservoir 11, transmission pumps 12, output pressure 13, metering device 56, or flow control valve 54 located within water distribution system 199 (step 310). The performance data may include existing sensor measurements such as flow data, valve positions, or pressure readings spanning a given time window.

Posterior estimation module 200 may generate an initial statistical distribution of the network parameter data (step 315). In one embodiment, the statistical distribution may encompass calculating a mean and standard deviation of each parameter, where the initial statistical distribution of such parameters may be denoted as $\vartheta^0$, in accordance with an embodiment of the present invention. The initial statistical distribution of each parameter with a measure of uncertainty information, may be represented as:

$$\vartheta^0 \sim N(\mu_\vartheta^0, \Sigma_\vartheta^0)$$

where N denotes a Gaussian distribution, $\mu_\vartheta^0$ the mean value of the parameters, and $\Sigma_\vartheta^0$ the covariance matrix of the parameter values.

Posterior estimation module 200 may also calculate an initial statistical distribution of the network demand data (step 320). In one embodiment, the statistical distribution may encompass calculating a mean and standard deviation of each demand and a measure of uncertainty information, where the initial statistical distribution of such parameters may be denoted as $d^0$, in accordance with an embodiment of the present invention. The initial statistical distribution of the network demand data with the measure of uncertainty information, may be represented as:

$$d^0 \sim N(\mu_d^0, \Sigma_d^0)$$

where N denotes a Gaussian distribution, $\mu_d^0$ the mean value of the demand values and $\Sigma_d^0$ the covariance matrix of the parameter values.

For the purpose of simplicity, $\vartheta^0$ hereinafter will be referred to as prior statistical distribution of the parameters, and $d^0$ hereinafter will be referred to as prior statistical distribution of the network demand data.

The statistical distribution of available field measurements is calculated by posterior estimation module 200, in accordance with the embodiments of the invention (step 325). In one embodiment, the statistical distribution may encompass calculating a mean and standard deviation of each field measurement, where the initial statistical distribution of such measurements may be denoted as y. The statistical distribution of field measurements with a measure of uncertainty information may also be utilized to determine the reliability of the field measurements when compared to sensor settings and specifications within water distribution system 199. In different embodiments, the field measurements and a measure of uncertainty information can cover one time measurement, multiple temporal windows, or be dynamically streamed at a chosen sampling interval.

In an exemplary embodiment of the invention the field measurements of hydraulic quantities y may be used, at a time t, and represented as:

$$y^t \sim N(\mu_y^t, \Sigma_y^t)$$

where $\mu_y^t$ represents the mean values of the field measurements and $\Sigma_y^t$ the covariance matrix of the field measurement values.

Utilizing prior statistical distribution of the network demand data, network parameter data and a set of field measurements at a specific time instant $y^t$, posterior estimation system 200 calculates the estimation of posterior network demand data and network parameter data by minimizing the weighted summed squared error between the initial model prediction and the given field measurements while adding a weighted summed squared error between the estimated network demand data and network parameter data and prior statistical distribution of the network demand data and network parameter data (step 330). This can be represented mathematically as the following:

$$\min_{\vartheta, d} J(\vartheta, d) = [\mu_y^t - f(d, \vartheta)]^T \Sigma_y^{t-1} [\mu_y^t - f(d, \vartheta)] +$$
$$(\mu_\vartheta^0 - \vartheta)^T \Sigma_\vartheta^{0-1} (\mu_\vartheta^0 - \vartheta) + (\mu_d^0 - d)^T \Sigma_d^{0-1} (\mu_d^0 - d)$$

where the sum of the squared errors is weighted by the inverse of the standard deviations squared. Utilizing this method, prior statistical distribution of the network demand data and network parameter data, and field measurements at y, posterior estimation module 200 produces the maximum posterior estimation of the network parameter data $\hat{\vartheta}$ and network demand data $\hat{d}$. It should be noted that it would be well understood by those skilled in the art that there are additional methods of calculating posterior estimation and other functions could be utilized.

Posterior estimation module 200 may group any unknown network demand data and network parameter data as a variable (step 335). Such variable may be represented as $x = [d^T \vartheta^T]^T$ such that:

$$x \sim N(\mu_x, \Sigma_x)$$

$$\mu_x = [\mu_d \mu_\vartheta]^T$$

where a matrix can be constructed based on the $\Sigma_x = \{\Sigma_d, \Sigma_\vartheta\}$.

Posterior estimation module 200 may then solve for the variables with an algorithm based on a preferential convergence criteria, in accordance with the embodiment of the present invention (step 340). In one exemplary embodiment of the invention, posterior estimation module 200 may utilize an algorithm where $F_k$ denotes the gradient of the function $f(x)$, with respect to variable x and calculated at point $\hat{x}_k$ ($F_k = \nabla f(x)|_{\hat{x}_k}$). The algorithm to solve for unknown network demand data and network parameter data may be written as:

$$\hat{x}_{k+1} = \hat{x}_k + [F_k^T \Sigma_y^{t-1} F_k + \Sigma_x^{0-1}]^{-1} F_k^T \Sigma_y^{t-1} [\mu_y - f(\hat{x}_k)] +$$
$$[F_k^T \Sigma_y^{t-1} F_k + \Sigma_x^{0-1}]^{-1} \Sigma_x^{0-1} (\mu_x - \hat{x}_k)$$

where posterior estimate of the network demand data and network parameter data may be a Gaussian variable represented by:

$$\hat{x} \sim N(\hat{\mu}_x, \hat{\Sigma}_x)$$

$$\hat{\mu}_x = \hat{x}_L$$

$$\hat{\Sigma}_x = [F_L^T \Sigma_y^{t-1} F_L + \Sigma_x^{0-1}]^{-1}$$

where from estimate x̂ posterior estimation module 200 can derive a new distribution of $\hat{\vartheta}^t$ and $\hat{d}^t$ (super script t denotes that the new distribution was calculated utilizing prior statistical distribution of the network demand data and network parameter data with field measurement at a time frame t) (step 345).

In another embodiment of the invention, the posterior estimation module 200 may conduct a recursive estimation of posterior network demand data and network parameter data. In such implementation, posterior estimation module 200 may conduct continuous calculations improving the quality and reliability of the statistical data (step 350). Once the field measurements at t+1 are available, posterior estimation module 200 may alter the previously discussed algorithm to reflect the estimated distribution at time t. This can be mathematically represented as following:

$$\min_{\vartheta, d} J(\vartheta, d) = [\mu_y^{(t+1)} - f(d, \vartheta)]^T \Sigma_y^{(t+1)^{-1}} [\mu_y^{(t+1)} - f(d, \vartheta)] +$$
$$(\mu_\vartheta^t - \vartheta)^{-1} \Sigma_y^{t-1} (\mu_\vartheta^t - \vartheta) + (\mu_d^t - d)^T \Sigma_d^{t-1} (\mu_d^t - d)$$

Figure 4:
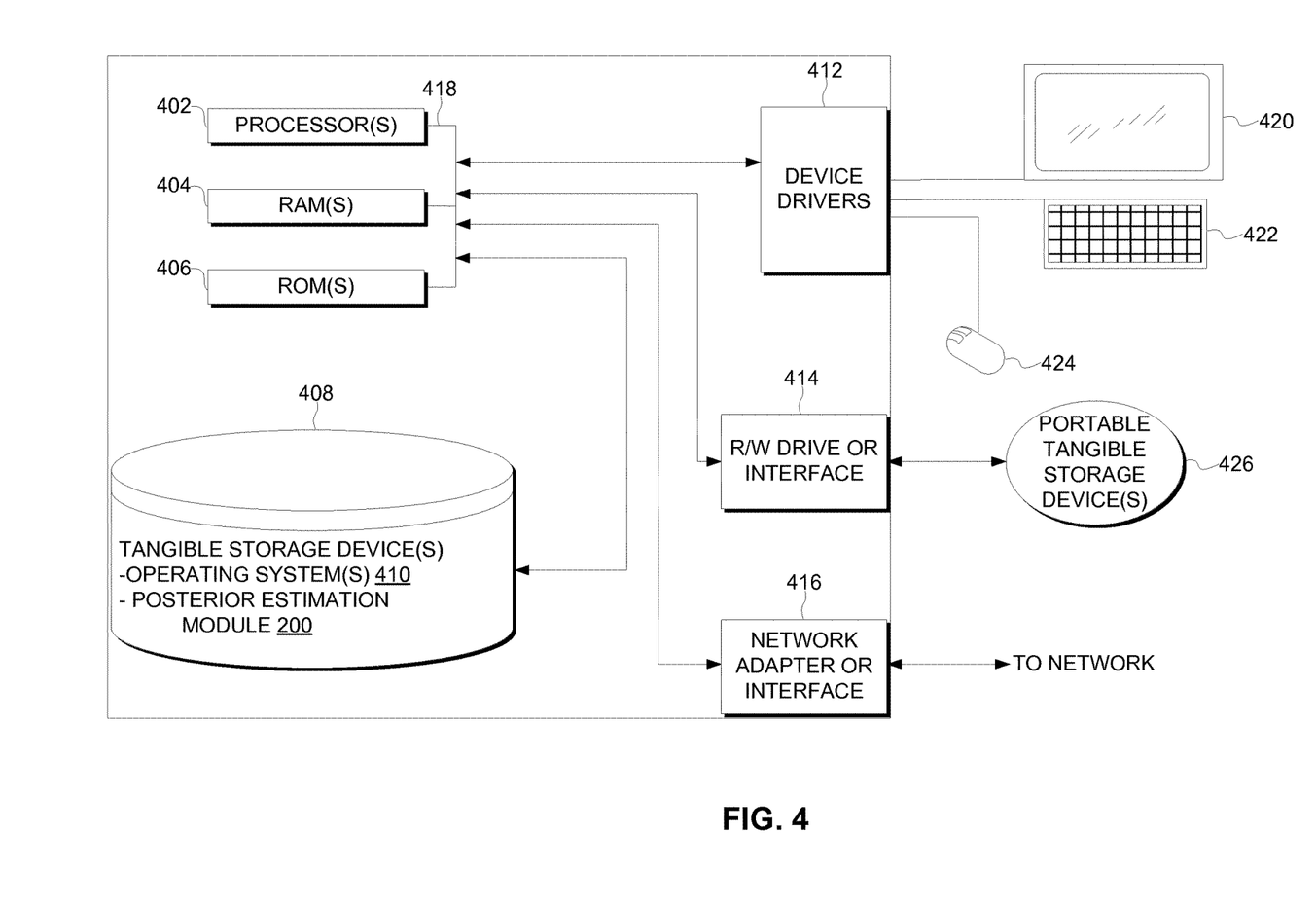
FIG. 4 is a block diagram of internal and external components within a computing device of FIG. 1, in accordance with an embodiment of the present invention.

FIG. 4 depicts a block diagram of components of the computing device 100 within water distribution system 199 of FIG. 1, in accordance with an embodiment of the present invention. It should be appreciated that FIG. 4 provides only an illustration of one implementation and does not imply any limitations with regard to the environments in which different embodiments may be implemented.

Computing device 100 can include one or more processors 402, one or more computer-readable RAMs 404, one or more computer-readable ROMs 406, one or more tangible storage devices 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within a system.

One or more operating systems 410, posterior estimation module 200 are stored on one or more of the computer-readable tangible storage devices 408 for execution by one or more of the processors 402 via one or more of the respective RAMs 404 (which typically include cache memory). In the illustrated embodiment, each of the computer-readable tangible storage devices 408 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 100 can also include a R/W drive or interface 414 to read from and write to one or more portable computer-readable tangible storage devices 426. Posterior estimation module 200 on computing device 100 can be stored on one or more of the portable computer-readable tangible storage devices 426, read via the respective R/W drive or interface 414 and loaded into the respective computer-readable tangible storage device 408.

Computing device 100 can also include a network adapter or interface 416, such as a TCP/IP adapter card or wireless communication adapter (such as a 4G wireless communication adapter using OFDMA technology). Posterior estimation module 200 on computing device 100 can be downloaded to the computing device from an external computer or external storage device via a network (for example, the Internet, a local area network or other, wide area network or wireless network) and network adapter or interface 416. From the network adapter or interface 416, the programs are loaded into the computer-readable tangible storage device 408. The network may comprise copper wires, optical fibers, wireless transmission, routers, firewalls, switches, gateway computers and/or edge servers.

Computing device 100 can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 can comprise hardware and software (stored in computer-readable tangible storage device 408 and/or ROM 406).

What is claimed is:

1. A method for posterior estimation of variables in water distribution networks, the method comprising:
    receiving, by one or more processors, a set of data inputs based on information received from one or more sensors within a water distribution system;
    determining, by the one or more processors, a first model of the water distribution network based on the set of data inputs, uncertainty information, and design parameters, wherein the design parameters comprise a rating associated with a distribution pump, a design output pressure associated with the distribution pump, a number of branches within the water distribution system, a number of branch connections within the water distribution system, and one or more elevations associated with the water distribution network;
    determining, by the one or more processors, a second model of the water distribution network based on the set of data inputs, and the first model;
    performing, by the one or more processors, a real-time recursive posterior estimation of the first model, wherein the recursive posterior estimation process continuously increases accuracy of a statistical distribution associated with the first model;
    displaying, by the one or more processors, the recursive posterior estimation to a user; and
    causing, by the one or more processors, the user to be notified of a malfunction of a piece of equipment within the water distribution system.

2. A method in accordance with claim 1, wherein receiving the set of data inputs further comprises:
    receiving, by the one or more processors, a set of parameters based on the water distribution system;
    determining, by the one or more processors, a statistical distribution of the set of parameters based on the water distribution system;
    receiving, by the one or more processors, a set of demands based on the water distribution system; and
    determining, by the one or more processors, a statistical distribution of the set of demands based on the water distribution system.

3. A method in accordance with claim 2, wherein determining the first model of the water distribution network based on data inputs further comprises:

calculating, by the one or more processors, uncertainty information, based on the statistical distribution of the set of parameters based on the water distribution system;

calculating, by the one or more processors, uncertainty information, based on statistical distribution of the set of parameters based on the set of demands;

receiving, by the one or more processors, a set of first field measurements; and calculating, by the one or more processors, a statistical distribution based on the set of first field measurements.

4. A method in accordance with claim 3, further comprising:

performing, by the one or more processors, a joint optimization of the set of demands, and the set of parameters based on the statistical distribution of the set of first field measurements; and calculating, by the one or more processors, a posterior probability based on the optimized set of demands, the optimized set of parameters, uncertainty information, and the set of first field measurements.

5. A method in accordance with claim 4, wherein calculating the second model of the water distribution network further comprises:

calculating, by the one or more processors, a distribution of the posterior probability based on a set of second field measurements, the optimized set of demands, and the optimized set of parameters.

6. A method in accordance with claim 5, further comprising:

performing, by the one or more processors, a recursive posterior estimation of the second model of the water distribution network, wherein the recursive posterior estimation process continuously increases accuracy of the statistical distribution of the set of demands, and the set of parameters.

7. A computer program product for posterior estimation of variables in water distribution networks, the computer program product comprising:

one or more computer readable non-transitory storage media and program instructions stored on the one or more computer readable storage media, the program instructions comprising:

program instructions to receive, by one or more processors, a set of data inputs based on information received from one or more sensors within a water distribution system;

program instructions to determine, by the one or more processors, a first model of the water distribution network based on the set of data inputs, uncertainty information, and design parameters, wherein the design parameters comprise a rating associated with a distribution pump, a design output pressure associated with the distribution pump, a number of branches within the water distribution system, a number of branch connections within the water distribution system, and one or more elevations associated with the water distribution network;

program instructions to determine, by the one or more processors, a second model of the water distribution network based on the set of data inputs, and the first model;

program instructions to perform, by the one or more processors, a real-time recursive posterior estimation of the first model, wherein the recursive posterior estimation process continuously increases accuracy of a statistical distribution associated with the first model;

program instructions to display, by the one or more processors, the recursive posterior estimation to a user; and program instructions to cause, by the one or more processors, the user to be notified a malfunction of a piece of equipment within the water distribution system.

8. A computer program product in accordance with claim 7, wherein receiving the set of data inputs further comprises:

program instructions to receive, by the one or more processors, a set of parameters based on the water distribution system;

program instructions to determine, by the one or more processors, a statistical distribution of the set of parameters based on the water distribution system;

program instructions to receive, by the one or more processors, a set of demands based on the water distribution system; and program instructions to determine, by the one or more processors, a statistical distribution of the set of demands based on the water distribution system.

9. A computer program product in accordance with claim 8, wherein determining the first model of the water distribution network based on data inputs further comprises:

program instructions to calculate, by the one or more processors, uncertainty information, based on the statistical distribution of the set of parameters based on the water distribution system;

program instructions to calculate, by the one or more processors, uncertainty information, based on the statistical distribution of the set of parameters based on the set of demands;

program instructions to receive, by the one or more processors, a set of first field measurements; and program instructions to calculate, by the one or more processors, a statistical distribution based on the set of first field measurements.

10. A computer program product in accordance with claim 9, further comprising:

program instructions to perform, by the one or more processors, a joint optimization of the set of demands, and the set of parameters based on the statistical distribution of the set of first field measurements; and program instructions to calculate, by the one or more processors, a posterior probability based on the optimized set of demands, the optimized set of parameters, uncertainty information, and the set of first field measurements.

11. A computer program product in accordance with claim 10, wherein program instructions to calculate the second model of the water distribution network further comprises:

program instructions to calculate, by the one or more processors, distribution of the posterior probability based on a set of second field measurements, the optimized set of demands, and the optimized set of parameters.

12. A computer program product in accordance with claim 11, further comprising: program instructions to perform, by the one or more processors, recursive posterior estimation of the second model of the water distribution network, wherein recursive posterior estimation process continuously increases accuracy of the statistical distribution of the set of demands, and the set of parameters.

13. A computer system for posterior estimation of variables in water distribution networks, the computer system comprising:

one or more computer processors;

one or more non-transitory computer readable storage media;

program instructions stored on the computer readable storage media for execution by at least one of the one or more processors, the program instructions comprising:

program instructions to receive, by one or more processors, a set of data inputs based on information received from one or more sensors within a water distribution system;

program instructions to determine, by the one or more processors, a first model of the water distribution network based on the set of data inputs, uncertainty information, and design parameters, wherein the design parameters comprise a rating associated with a distribution pump, a design output pressure associated with the distribution pump, a number of branches within the water distribution system, a number of branch connections within the water distribution system, and one or more elevations associated with the water distribution network;

program instructions to determine, by the one or more processors, a second model of the water distribution network based on the set of data inputs, and the first model;

program instructions to perform, by the one or more processors, a real-time recursive posterior estimation of the first model, wherein the recursive posterior estimation process continuously increases accuracy of a statistical distribution associated with the first model;

program instructions to display, by the one or more processors, the recursive posterior estimation to a user; and program instructions to cause, by the one or more processors, the user to be notified of an anomaly within the water distribution system based on the increased accuracy, wherein the anomaly comprises a malfunction of a piece of equipment within the water distribution system.

14. A computer system in accordance with claim 13, wherein receiving the set of data inputs further comprises:

program instructions to receive, by the one or more processors, a set of parameters based on the water distribution system;

program instructions to determine, by the one or more processors, a statistical distribution of the set of parameters based on the water distribution system;

program instructions to receive, by the one or more processors, a set of demands based on the water distribution system; and program instructions to determine, by the one or more processors, a statistical distribution of the set of demands based on the water distribution system.

15. A computer system in accordance with claim 14, wherein program instructions to determine the first model of the water distribution network based on data inputs further comprises:

program instructions to calculate, by the one or more processors, uncertainty information, based on the statistical distribution of the set of parameters based on the water distribution system;

program instructions to calculate, by the one or more processors, uncertainty information, based on the statistical distribution of the set of parameters based on the water distribution system;

program instructions to receive, by the one or more processors, a set of first field measurements; and program instructions to calculate, by the one or more processors, a statistical distribution based on the set of first field measurements.

16. A computer system in accordance with claim 15, further comprising:

program instructions to perform, by the one or more processors, a joint optimization of the set of demands, and the set of parameters based on the statistical distribution of the set of first field measurements; and program instructions to calculate, by the one or more processors, a posterior probability based on the optimized set of demands, the optimized set of parameters, uncertainty information, and the set of first field measurements.

17. A computer system in accordance with claim 16, wherein program instructions to calculate the second model of the water distribution network further comprises:

program instructions to calculate, by the one or more processors, distribution of the posterior probability based on a set of second field measurements, the optimized set of demands, and the optimized set of parameters.

18. A computer system in accordance with claim 17, further comprising:

program instructions to perform, by the one or more processors, recursive posterior estimation of the second model of the water distribution network, wherein recursive posterior estimation process continuously increases accuracy of the statistical distribution of the set of demands, and the set of parameters.

19. A method in accordance with claim 1, further comprising:

causing, by the one or more processors, the user to be notified of a leak within the water distribution system.

20. A computer program product in accordance with claim 7, further comprising:

program instructions to cause, by the one or more processors, the user to be notified of a leak within the water distribution system.

* * * * *